(12) United States Patent
Ellenkamp-Van Olst et al.

(10) Patent No.: US 8,640,928 B2
(45) Date of Patent: Feb. 4, 2014

(54) CLOSURE ASSEMBLY WITH VALVE AND METHOD FOR ITS MANUFACTURING

(75) Inventors: Lenny Marita Ellenkamp-Van Olst, Doetinchem (NL); Sebastiaan Wilhelmus Josephus Den Boer, Arnhem (NL); Gerrit Jan Stegeman, Lochem (NL); Jan Van Alfen, Nijmegen (NL)

(73) Assignee: Plasticum Group B.V., Tilburg (NL)

( * ) Notice: Subject to any disclaimer, the term of this patent is extended or adjusted under 35 U.S.C. 154(b) by 826 days.

(21) Appl. No.: 12/520,212

(22) PCT Filed: Dec. 20, 2007

(86) PCT No.: PCT/EP2007/011490
§ 371 (c)(1),
(2), (4) Date: Nov. 6, 2009

(87) PCT Pub. No.: WO2008/074517
PCT Pub. Date: Jun. 26, 2008

(65) Prior Publication Data
US 2010/0089921 A1    Apr. 15, 2010

(30) Foreign Application Priority Data
Dec. 20, 2006    (EP) .................................... 06077277

(51) Int. Cl.
*B65D 37/00*    (2006.01)

(52) U.S. Cl.
USPC ........... 222/213; 222/490; 222/494; 222/545; 222/570; 137/843; 220/213; 220/229; 220/309.2

(58) Field of Classification Search
USPC ........ 220/213, 229, 309.1–309.2, 200, 254.3; 222/212–213, 490–491, 494, 513, 522, 222/525, 545, 570, 573–574, 562; 137/843; 29/592
See application file for complete search history.

(56) References Cited

U.S. PATENT DOCUMENTS

| | | | |
|---|---|---|---|
| 5,105,985 A * | 4/1992 | Kroeber | 222/107 |
| 5,115,950 A * | 5/1992 | Rohr | 222/490 |
| 5,180,072 A * | 1/1993 | Oehlert | 215/209 |
| 6,065,642 A * | 5/2000 | Brown | 222/92 |

(Continued)

FOREIGN PATENT DOCUMENTS

| | | |
|---|---|---|
| EP | 0405472 A1 | 1/1991 |
| EP | 1426303 A2 | 6/2004 |
| EP | 1481909 A1 | 12/2004 |
| WO | WO99/10247 | 3/1999 |

*Primary Examiner* — Paul R Durand
*Assistant Examiner* — Andrew P Bainbridge
(74) *Attorney, Agent, or Firm* — Tutunjian & Bitetto, P.C.

(57) ABSTRACT

A closure assembly for a container includes a closure cap having an open ended body with a peripheral wall and a top wall provided with a dispensing passage which is defined by a collar arranged to the top wall. A self closing valve is arranged in the closure cap. The valve includes a slit central portion and a skirt extending downwardly from the central portion, which has an outwardly extending flange. The skirt is arranged in the collar and the flange is located below the collar and extends radially outwardly beyond it. On a lower surface of the top wall, a plurality of lips is formed outward from the collar. The lips are folded over the flange such that the latter is partly enveloped between the lips and the top wall so as to secure the valve in the closure cap.

11 Claims, 10 Drawing Sheets

(56) References Cited

U.S. PATENT DOCUMENTS

| | | |
|---|---|---|
| 6,089,419 A | 7/2000 | Gross |
| 6,273,296 B1 | 8/2001 | Brown |
| 6,672,331 B2 * | 1/2004 | Heald et al. .................. 137/505 |
| 6,786,363 B1 * | 9/2004 | Lohrman ...................... 222/213 |
| 7,128,245 B2 * | 10/2006 | Lee ................................ 222/212 |
| 2004/0178230 A1 * | 9/2004 | Feierabend ................... 222/494 |
| 2006/0138163 A1 * | 6/2006 | Danks .............................. 222/1 |

* cited by examiner

CLOSURE ASSEMBLY WITH VALVE AND METHOD FOR ITS MANUFACTURING

BACKGROUND

1. Technical Field

The present invention relates to a closure assembly for a container for containing a substance, e.g. foodstuffs or cosmetic products, which closure assembly comprises:

- a closure cap which can be attached or is attached to the container, which closure cap has a body with a peripheral wall and a top wall provided with a dispensing passage which is defined by a tubular collar arranged to the top wall, which body is open on the end opposite the top wall so as to be placed on an upper portion of the container, and
- a resilient self closing valve, which is arranged in the closure cap for closing off the dispensing passage and which comprises a central portion, which is provided with at least one through slit which is closed and seals the inside of the container when it is in an unloaded state, and which is deformable by pressure from the inside of the container to a state in which the slit is open so as to allow dispensing of a substance from the container, said closing valve further comprising a skirt which extends downwardly from the peripheral edge of the central portion, and which on its lower end has an outwardly extending flange,
- wherein the skirt of the valve is arranged concentrically in the collar of the cap and the flange of the valve is located below the collar and extends radially outwardly beyond it.

2. Description of the Related Art

In EP 405 472 a closure for use on a squeeze type container is described. The closure has a top wall with a collar extending upwardly from it. In the closure assembly a self closing valve is arranged, comprising a convex dome shaped member which is positioned over the outer end of a dispensing passage defined by the collar and also over the upper end face of the collar. The valve further comprises a skirt extending from the peripheral edge of the dome shaped member downwardly through the collar. On the opposite end of the skirt an outwardly extending flange is formed which engages behind the lower end of the collar thereby fixing the valve in the closure cap.

SUMMARY

An object of the invention is to provide an improved closure assembly.

This object is achieved by a closure assembly, wherein the flange of the valve has a thickened portion, and, on a lower surface of the top wall, a round wall or a plurality of lips arranged in a round configuration are integrally formed at a distance coaxially and radially outward from the collar defining the dispensing passage, which cylindrical wall or lips are folded over at least a part of the flange such that the flange is enveloped at least partly between the round wall or the lips and the top wall so as to secure the valve in the closure cap.

The invention also relates to a method for manufacturing a closure assembly for a container for containing a substance, comprising the steps of:

- providing a closure cap which is to be attached to the container, which closure cap has a body with a, preferably substantially cylindrical, peripheral wall and a top wall provided with a dispensing passage which is defined by a tubular collar arranged to the top wall, which body is open on the end opposite the top wall so as to be placed over an upper portion of the container, and which cap has round, preferably cylindrical, wall or lips arranged in a round configuration, which are preferably shaped as cylinder segments, integrally formed on the lower surface of the top wall and extending therefrom coaxially with the dispensing passage;
- arranging a covering lid on the upper side of the top wall thereby covering the dispensing passage;
- providing a resilient self closing valve comprising a central portion provided with at least one through slit, and a skirt which extends downwardly from the peripheral edge of the central portion, and an outwardly extending flange which is provided at the lower end of the skirt;
- positioning the valve in the closure cap by inserting the central portion and the skirt from below concentrically within the cylindrical collar dispensing passage, and by positioning the flange of the valve against the lower end of the collar; and
- folding the round wall or lips over at least a part of the flange thereby at least partly enveloping the flange between said wall or said lips and the top wall so as to secure the valve in the closure cap.

The fact that the round wall or lips are extending downwardly from the top wall makes it possible to approach them from below with a suitable tool to bend them so as to secure the flange of the valve. This makes it possible to bend the wall or lips with a lid positioned over the upper surface of the top wall. Preferably, the closure cap and the lid are provided by injection moulding them in one piece from a suitable plastic. The closure cap and the lid are then mutually connected by an integral hinge or the like, which as such is known from the prior art. It is advantageous to have the hingedly connected lid in a closed position with respect to the cap, because it provides an easier handling of the closure cap during the assembly process, wherein the valve is mounted in the cap. In particular when the assembly takes place automatically, the closed lid allows for a simpler handling equipment to convey and hold the cap during the assembly process.

Preferably the closure cap is positioned upside down when positioning the valve in it, in which event the simple handling equipment comes forward even more.

The lips or cylindrical wall are bended by heating them and submitting a mechanical bending pressure force to them by a forming surface of a suitable tool. Preferably the energy for heating the lips or the cylindrical wall is provided by ultrasonic waves which are directed into them, preferably through the forming surface.

Preferably the valve is manufactured by injection moulding it from a silicone rubber. Preferably, the slit is provided in the central portion of the valve just before positioning the valve in the closure cap.

Preferably, at the upper end of the collar an inwardly extending radial flange is provided. This flange prevents dispensed substances or other particles from getting into the annular space between the skirt of the valve and the inside of the collar, which could impede an outward movement of the skirt of the valve and thereby impede the opening of the valve. Furthermore, in the event of foodstuffs, smearing of the space between the skirt of the valve and the inside of the collar could cause a hygiene risk.

Another aspect of the invention relates to a self closing valve made of a resilient material, in particular silicone rubber, and comprising a dome shaped central portion, which is provided with at least one through slit and which is inwardly concave when it is in an unloaded state, in which unloaded state the slit is closed and seals the inside of the container, and which dome shaped central portion is deformable by pressure from the inside of the container to a convex shape in which the slit is open so as to allow dispensing of a substance from the container, said closing valve further comprising a skirt which extends downwardly from the peripheral edge of the central portion, and which on its lower end has an outwardly extending flange.

Such a valve is known from EP 160 336.

This aspect of the invention has for an object to provide a self closing valve which has improved opening characteristics with respect to the known valve.

This object is achieved by a valve according to the present principles, wherein at the transition between the dome shaped central portion and the skirt an annular groove is present.

BRIEF DESCRIPTION OF DRAWINGS

The invention will be described in more detail in the following description of preferred embodiments with reference to the drawings, wherein.

DETAILED DESCRIPTION OF PREFERRED EMBODIMENTS

Figure 1:
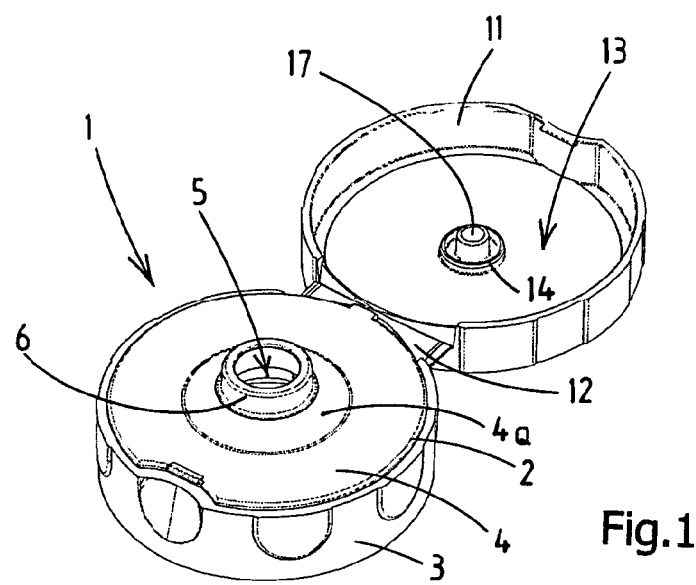
FIG. 1 shows a view in perspective of a closure cap of a closure assembly according to the invention with a hingedly connected covering lid in an open position.
Figure 2:
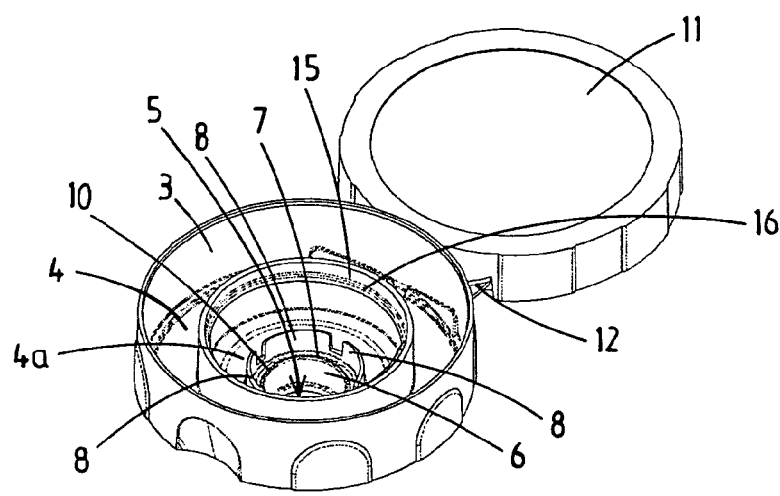
FIG. 2 shows the closure cap of FIG. 1 in a position upside down.

In FIGS. 1 and 2 a closure cap 1 is shown which is to be attached to a container, e.g., a squeeze type container for foodstuffs, like sauces as, e.g., ketchup, mayonnaise or mustard. Such containers usually have a neck for attaching a closure.

The closure cap 1 has a body 2 with a substantially cylindrical peripheral wall 3 and a top wall 4. The peripheral wall can also have another round shape. The top wall 4 is provided with a dispensing passage 5 which is defined by a cylindrical collar 6 arranged to the top wall and extending upwardly therefrom. The body 2 is open on the end opposite the top wall 4 so as to be placed over an upper part of the container. In general, the container will have a neck portion with an outer thread. Inside the peripheral wall 3, the closure cap 1 has a cylindrical skirt 15 which extends from the top wall 4 downward and which on its inside is provided with a thread 16 for cooperating with the outer thread on the neck of the container.

Figure 6:
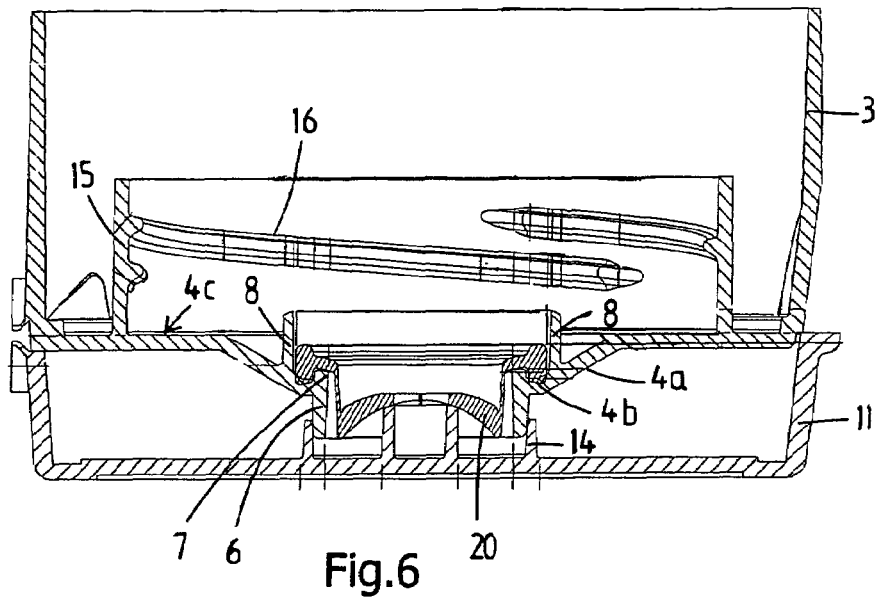
FIG. 6 shows a cross section of a preferred embodiment of a closure assembly according to the invention during assembly.

The top wall 4 is generally flat and has a conical central portion 4a. The collar 6 is located in the centre of the conical portion 4a. The lower end 7 of the collar 6 extends beyond the lower surface 4b of the top wall 4 directly surrounding the collar 6, in this case thus the conical part 4a, which is best seen in FIG. 6. In a practical embodiment, the lower end 7 may extend 0.6 mm from the lower surface 4b directly surrounding the collar 6.

Figure 8:
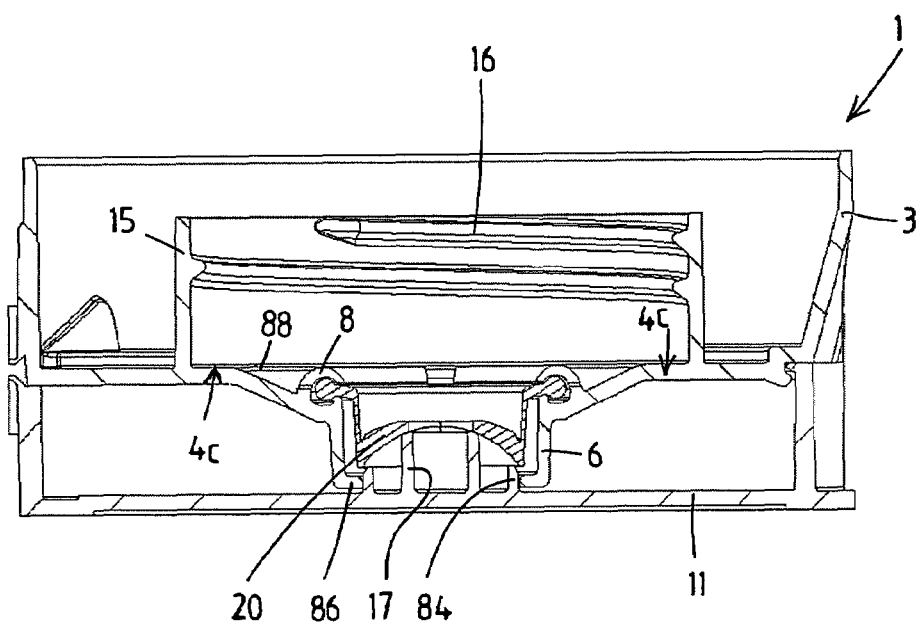
FIG. 8 shows a cross section of another preferred embodiment of a closure assembly according to the invention.

In a preferred embodiment, which is shown in FIG. 8, the upper end of the collar 6 is provided with an inwardly extending radial flange 86.

A plurality of lips 8 shaped as cylinder segments are integrally formed at a distance coaxially and radially outward from the collar 6. The lips 8 extend in an undeformed state, which is shown in FIGS. 2 and 6, in axial direction beyond the flat part of the lower surface of the top wall 4 as can be seen in FIG. 6. The lips 8 surround the collar 6 such that between the lower end 7 of the collar 6 and the cylindrical wall or the lips 8 an annular seat 10 is formed. Alternatively, a full cylindrical wall instead of lips could be provided, which could be bended over the flange 24. However, the use of separate lips allows for easier deformation as a closed cylindrical wall.

A covering lid 11 is hingedly connected to the closure cap 1 by means of one or more a hinge members 12. The lid 11, the closure cap 1 and the one or more hinge members 12 are in the preferred embodiment moulded integrally from a plastics material, e.g., polypropylene. Although not preferred at this moment, the lid and the closure cap could also be separate components, which are assembled. The lid 11 is pivotable from a closed position, which is shown in FIGS. 6 and 7 in cross section, where it lies over the upper surface of the top wall 4 and the dispensing passage 5, to an open position spaced away from the upper surface of the top wall 4 and the dispensing passage 5, as is shown in FIGS. 1 and 2.

Figure 7:
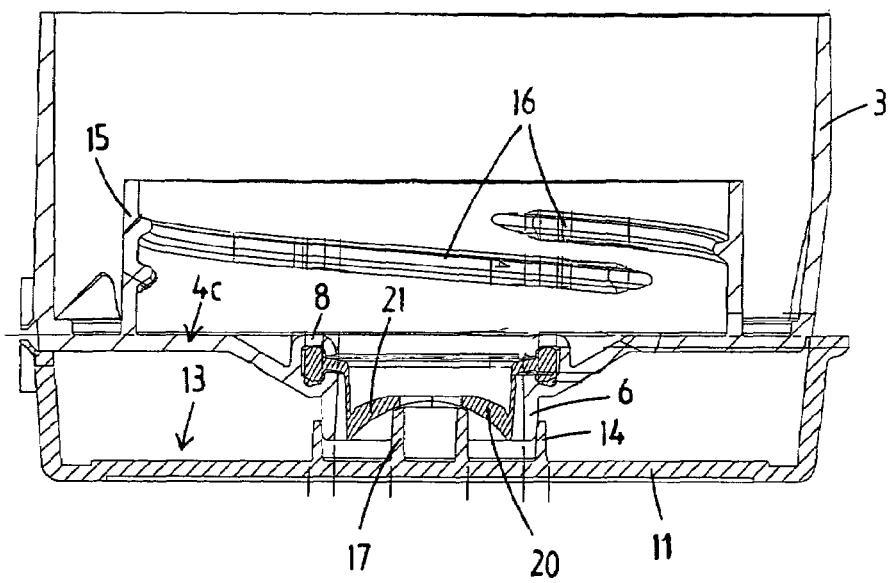
FIG. 7 shows a cross section of the closure assembly after the valve has been secured in the closure cap.

The lid 11 has on its lower side 13 an annular clamping sleeve 14 for engagement on the outside of the collar 6 in the closed position of the lid 11 as is shown in FIGS. 6 and 7. Alternatively, the lid 11 has a clamping sleeve 84 which engages on the inner end of the flange 86 of the collar 6, as can be seen in FIG. 8. Furthermore the lid 11 has a stop member 17, in this case also with a cylindrical shape, protruding from the lower side 13 of the cover 11.

Figures 3, 4:
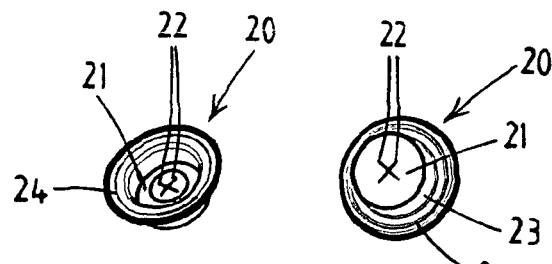
FIG. 3 shows a perspective view from above of a self closing valve of a closure assembly according to the invention.
FIG. 4 shows a perspective view from below of the self closing valve of FIG. 3.
Figure 5:
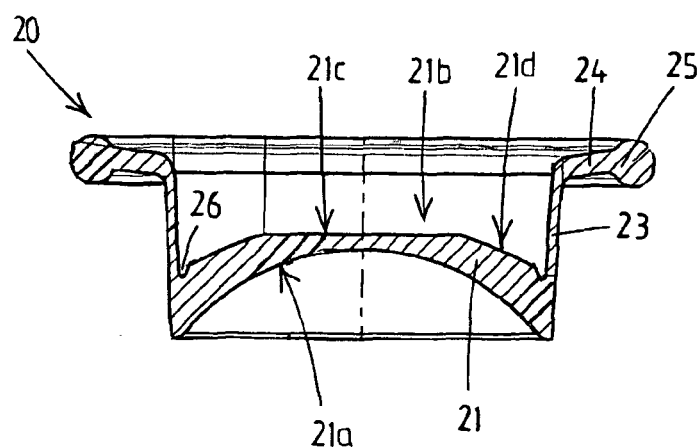
FIG. 5 shows a cross section of the self closing valve of FIG. 3.

A resilient self closing valve 20, which is shown in FIGS. 3-5, is arranged in the closure cap 1 so as to close off the dispensing passage 5. The valve 20 is manufactured from a silicone rubber by injection moulding. The valve 20 comprises a dome shaped central portion 21, which in this embodiment is provided with two intersecting through slits 22. Also, another number of slits is conceivable. The dome shaped central portion 21 is inwardly concave when it is in an unloaded state, which state is shown in the figures. In this unloaded state the slits 22 are closed and the valve 20 seals the dispensing passage 5. The dome shaped central portion 21 is deformable to a convex shape in which the slits 22 are open. During opening of the valve the skirt moves at least partly outwardly. This deformation from the concave to the convex shape is induced by a pressure increase in the inside of the container, e.g., resulting from squeezing the container. A substance can then be dispensed from the container through the opened up slits 22. The closing valve 20 further comprises a skirt 23 which extends downwardly from the peripheral edge of the central portion 21.

At the transition between the lower surface of the dome shaped central portion 21 and the skirt 23, an annular groove 26 is present, thereby providing a resilient circumferential connection between the dome shaped central portion 21 and the skirt 23 which allows the transition of the dome shaped member from a concave to a convex shape and vice versa.

On the lower end of the skirt 23 an outwardly extending circumferential flange 24 is arranged. The flange 24 has is on its outer portion 25 thickened with respect to the remainder of the flange 24.

In a preferred embodiment, the upper surface 21a of the dome shaped central portion 21 has a constant radius of curvature as can be seen in the cross sectional view of FIG. 5. The lower surface 21b of the dome shaped central portion 21 has a flat central surface part 21c and a conical outer surface part 21d which surrounds the flat surface part 21c. The conical surface part 21d is slightly curved seen in the cross section of FIG. 5.

For the sake of clarity it is noted that the valve 20 is shown upside down in FIG. 5 and that in the figure the upper surface 21a is facing downwards and the lower surface is facing upwards.

The skirt 23 of the valve 20 has a relatively small thickness whereby it can deform and move outwardly during opening of the valve. Preferably it has a thickness of about 0.3 mm and a length in the range 3.5-5.5 mm, most preferably in the range 4-5 mm. The groove 26 between the skirt 23 and the dome shaped central portion 21 of the valve 20 has a depth of 0.4-1.2 mm measured from the outer edge of the conical surface part 21d.

In a particularly preferred embodiment of the valve 20 the skirt 23 has a thickness of 0.3 mm, a length of 5 mm and the groove 26 has a depth of 0.5 mm. In another particularly preferred embodiment of the valve 20 the skirt 23 has a thickness of 0.3 mm, a length of 4 mm, and the groove 26 has a depth of 1 mm. Tests have shown that the latter embodiment opens up with a notably lower pressure than other embodiments. This is advantageous if, e.g., a sauce with particles is to be dispensed and a filter effect where the particles remain in the valve 20 is reduced.

During assembly of the valve into the closure cap 1, the covering lid 11 is in the closed position. The closure cap 1 is preferably positioned upside-down and resting on the top surface of the lid 11 as is shown in FIG. 6.

Next, the valve 20 is arranged in the closure cap 1 by inserting the dome shaped central portion 21 and the skirt 23 from the open ended side of the body 2 concentrically within the cylindrical collar 6 and in the dispensing passage 5. There is a radial space between the outer surface of the skirt 23 and the inner surface of the collar 6.

The flange 24 of the valve 20 is located below the collar 6 and extends in the radial outward direction beyond it. The flange 24 is positioned against the lower end 7 of the collar 6 and the thickened outer portion 25 of the flange 24 is received in the seat 10 constituted between the lips 8 and the lower end 7 of the collar 6.

When the thickened portion 25 of the flange 24 of the valve 20 is in the seat 10, the circumferential edge of the slit central dome shaped portion 21 of the valve 20 is located at the same height as the upper edge of the collar 6 as can be seen in FIGS. 6 and 7. Alternatively, the circumferential edge of the slit central dome shaped portion 21 of the valve 20 is located against or just below the flange 86 at the upper end of the collar 6 as can be seen in FIG. 8. The dome shaped portion 21 rests against or is just a small distance spaced from the end face of the stop member 17. In use, in the event that the lid 11 is in the closed position as is the case in FIGS. 6 and 7, the stop member 17 prevents the central dome shaped portion 21 of the valve 20 to deform outwardly in case the inside of the container is pressurized. Thus, the valve 20 is kept closed although the container is internally pressurized, thereby preventing spoiling of substance on the lid 11 and the upper face of the top wall 4.

Next, the lips 8 are folded over the thickened portion 25 of the flange 24 thereby enveloping the thickened portion 25 between the lips 8 and the top wall 4 such that the valve 20 is secured in the closure cap 1. The lips 8 are folded by pressing a forming surface (not shown) against them while the plastics material is heated. The heating of the material results preferably from ultrasonic frequency vibrations which are directed into the lips 8 via the forming surface. The ultrasonic frequency vibrations are generated by a suitable generator therefore, which generators are known in the art. Heating could also be provided by other means, but heating by means of ultrasonic vibrations is preferred, because it allows for a considerably reduced heating time. When the plastics material is cooled again, the bent lips 8 hold the silicone rubber valve 20 securely in the seat 10. The thickened portion 25 functions as a sealing ring within the seat 10 such that no fluid substance can flow beyond the valve 20 except for substance expelled through the open slits 22.

The lips 8 in the folded state as shown in FIGS. 7 and 8 are not extending beyond the level of the flat part 4c of the top wall 4. Thereby, the possibility is created to arrange a foil 88 in the closure cap against the top wall. The foil 88 is an induction sealing foil which after the closure cap has been screwed onto the neck portion of the container engages the top rim surrounding the dispensing opening of the container. The sealing foil 88 can then be heated by induction heating whereby it is attached to said top rim and seals the dispensing opening of the container. The induction seal 88 protects the substance in the container against quick degradation. The consumer, before dispensing the substance from the container for the first time has to remove this induction seal 88.

It is preferred to make the slits 22 in the central dome shaped portion 21 of the valve 20 just before positioning the valve 20 in the closure cap 1. This has the advantage that between the moulding of the valve and the actual arrangement of the valve 20 in the closure cap 1, the chance that dust or other undesired dirt particles getting into the slits 22, which could contaminate foodstuffs flowing therethrough, is reduced.

Figure 15:
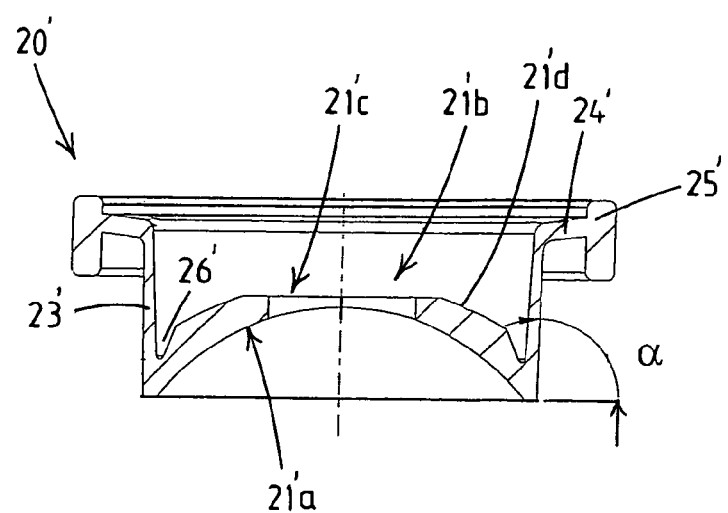
FIG. 15 shows a sectional view of another embodiment of a self closing valve of a closure assembly according to the invention.

In FIG. 15 an alternative embodiment of a self closing valve is shown. Parts of the self closing valve that correspond to the valve of FIGS. 3-5 are indicated by the same reference numerals, provided with a prime (').

A difference between the valve 20' of FIG. 15 and the valve 20 of FIG. 5 is that the valve of FIG. 5 has on its outer portion 25 a thickened portion with a substantially circular cross section, whereas the valve 20' of FIG. 15 has an outer portion 25' with a substantially rectangular shape. The outer portion 25' is higher than the outer portion 25 of valve 20, which was found to allow a better fixation of the valve 20' by the lips 8 in the closure cap 1.

Another difference between the valve 20' of FIG. 15 and the valve 20 of FIG. 5 is that the skirt 23' of the valve 20' is less conical than the skirt 23 of the valve 20. Preferably the angle between the central axis of the valve 20' and the skirt is about 1°, or in other words the angle α between the plane normal to the central axis of the valve is 89°. The conical shape of the skirt 23, 23' is advantageous for the relief of the valve 20, 20' from the mould. During the assembly process of a closure cap, the valves 20, 20' are collected in a collection box or the like from which they are automatically picked one by one to be arranged in a closure cap 1. It was found that the valves 20' with a draft angle of about 1° have a smaller tendency to nest into each other when they are in the collection box. This results in less faults during the assembly process, which is economically advantageous.

Another difference between the valve 20 of FIG. 5 and valve 20' of FIG. 15 is that the latter has a deeper groove 26'. The groove 26' between the skirt 23' and the central portion 21 of the valve 20' has a depth of approximately 1 mm measured from the outer edge of the conical part 21d'.

Figure 9:
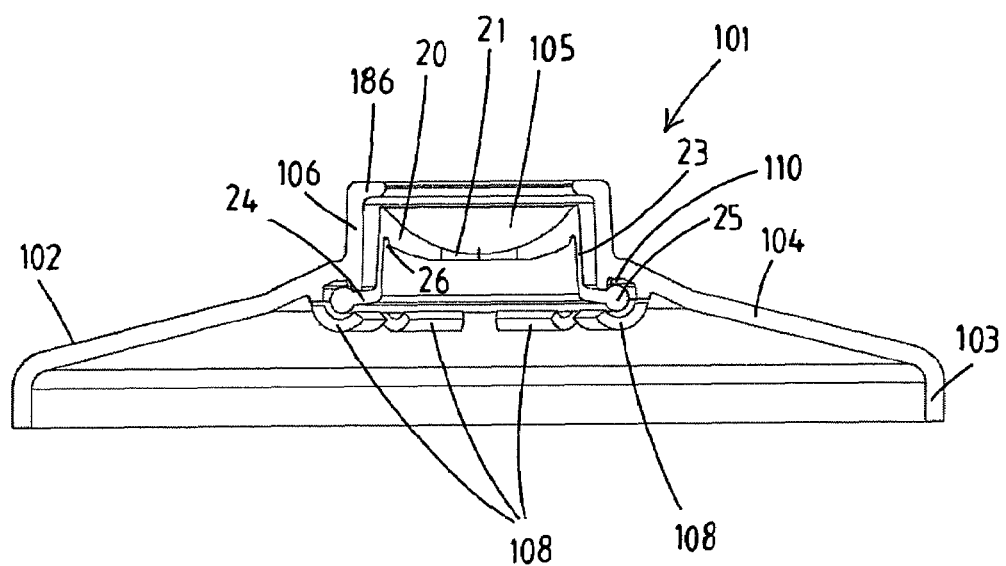
FIG. 9 shows a sectional view of a closure cap for a tube container according to the invention.
Figure 10:
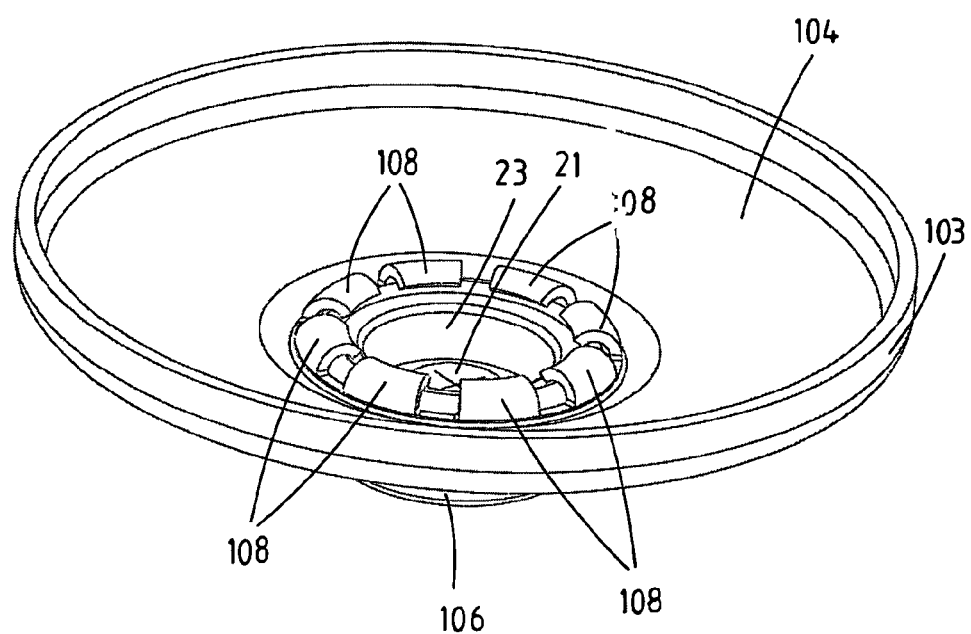
FIG. 10 shows a view in perspective from below the closure cap of FIG. 9.
Figure 11:
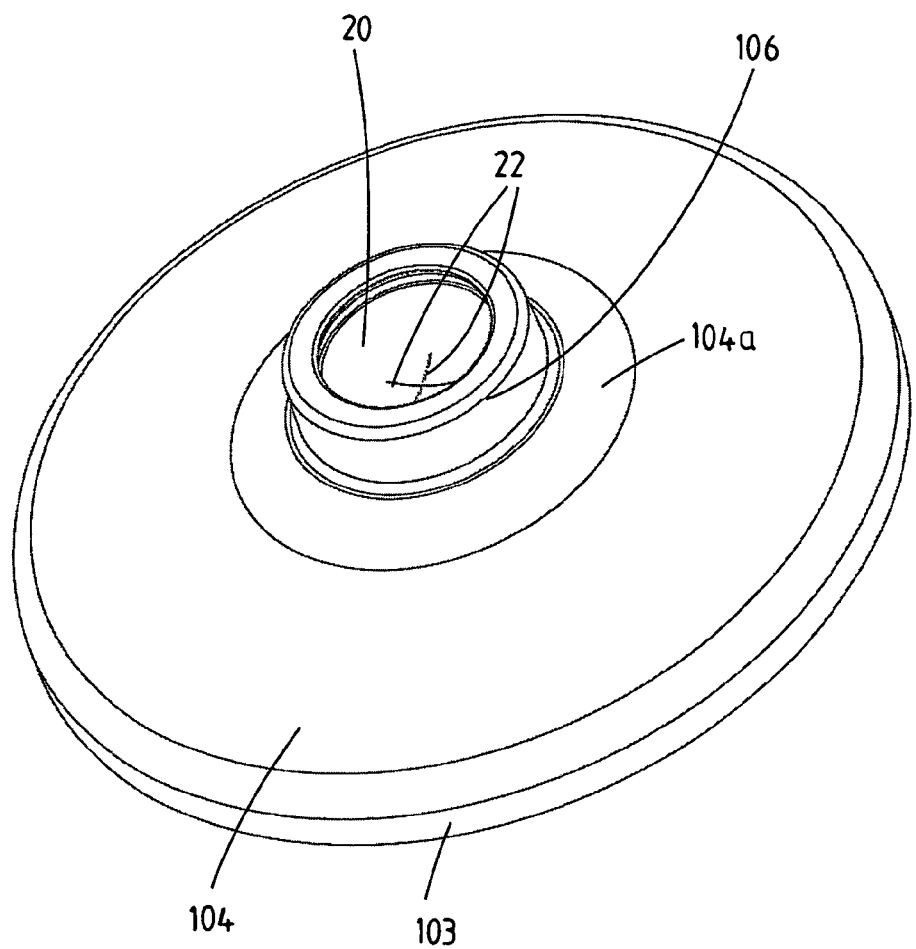
FIG. 11 shows a view in perspective from above the closure cap of FIG. 9.
Figure 12:
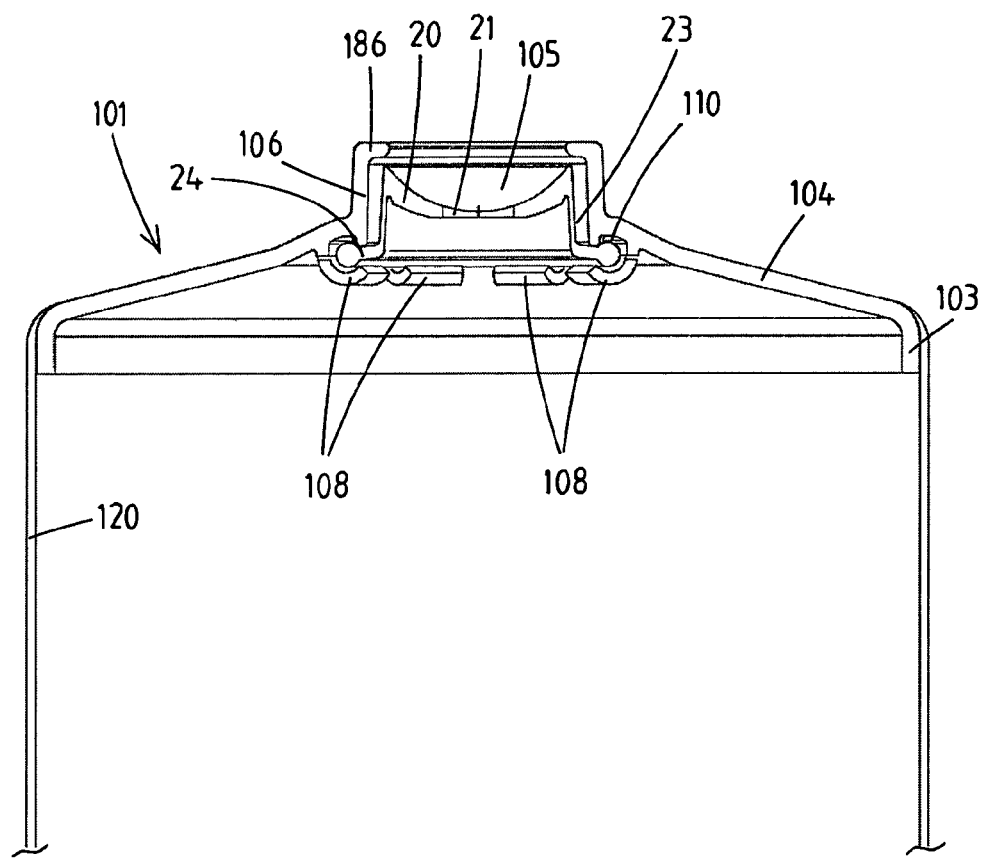
FIG. 12 shows a sectional view of an upper part of a tube container with the closure cap of FIG. 9.

In FIGS. 9-12, another embodiment of a closure cap according to the invention is illustrated. FIGS. 9-11 show a closure cap 101 which is adapted to be used for a tube container 120 (see FIG. 12). Such a tubular container body 120 is typically manufactured by extrusion of a tube from a suitable plastic material, e.g. polyethylene and cutting the extruded tube to length.

The closure cap 101 is preferably made by injection moulding from a suitable thermoplastic material, e.g. polypropylene or polyethylene, and has a body 102 with a peripheral wall 103 and a top wall 104. The top wall 104 is provided with a dispensing passage 105 which is defined by a tubular collar 106 arranged to the top wall 104. The body 102 is open on the end opposite the top wall 104.

In the embodiment shown in FIGS. 9-12, the top wall 104 is generally conical and with respect thereto has a central portion 104a, which is in this example conical, in the centre of which the collar 106 is located.

A plurality of lips 108 shaped as cylinder segments are integrally formed at a distance coaxially and radially outward from the collar 106. The lips 108 extend in an undeformed state in axial direction. The lips 108 surround the collar 106 such that between the lower end 107 of the collar 106 and the cylindrical wall or the lips 108 an annular seat 110 is formed.

A valve 20 is arranged in the closure cap 101 by inserting the central portion 21 of the valve 20 and the skirt 23 from the open ended side of the body concentrically within the collar 106 in the dispensing passage 105. The flange 24 of the valve 20 is positioned against the lower end 107 of the collar 106. The lips 108 are folded over the thickened portion 25 of the flange 24 thereby enveloping at least a part of the flange 24 between said lips 108 and the top wall 104 so as to secure the valve 20 in the closure cap 101. The lips 108 are folded preferably by application of ultrasonic frequency vibrations as is described hereabove.

The assembled closure cap 101 can be attached to a tubular container body 120 of a tube container. This is preferably done by laying an end portion of the tubular body 120 against the peripheral wall 103 of the closure cap, in the shown example of FIG. 12 on the outer side. Next, said end portion of the container body is sealed to the peripheral wall by welding.

After the closure cap 101 and the tubular container body are attached to each other, they can be conveyed to a filling machine where the tube container is filled with a substance through the open rear end of the tubular body. Next, the rear end of the tubular body is closed by sealing, preferably by folding it and welding the end so as to close it.

Figure 13:
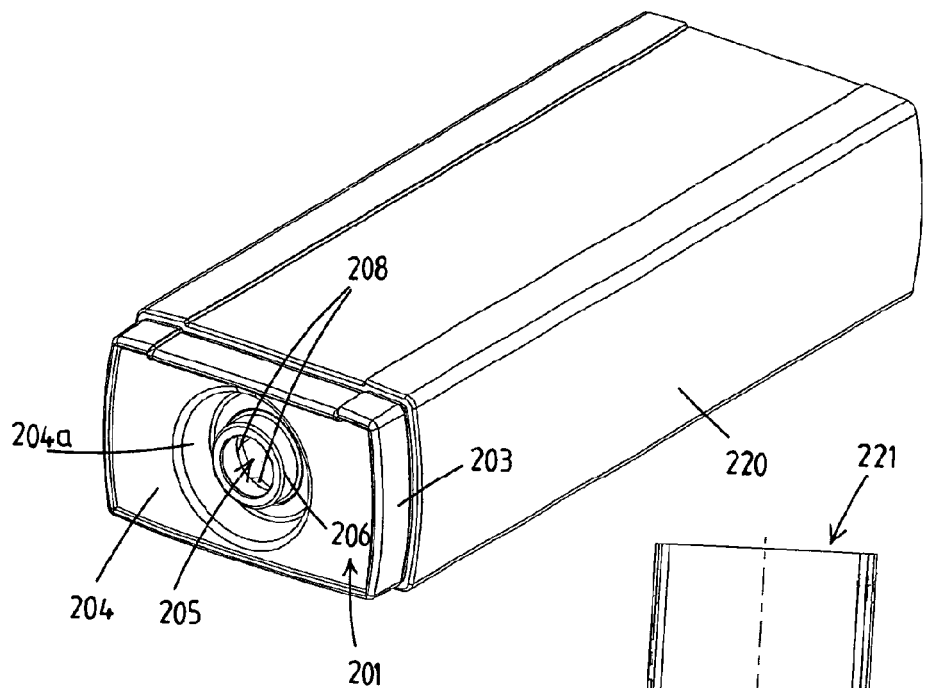
FIG. 13 shows a view in perspective of another tube container with an integral closure cap.
Figure 14:
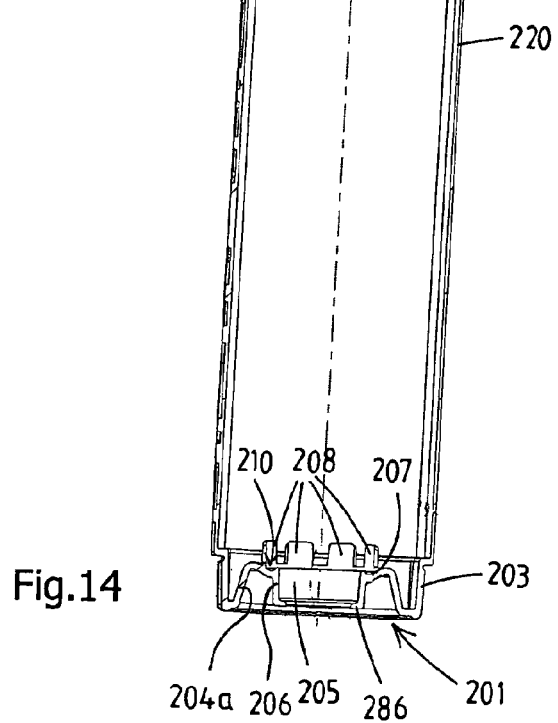
FIG. 14 shows a sectional view of the container of FIG. 13.

According to the invention it is also possible to form a container integrally with a closure cap as will be described in the following with reference to FIGS. 13 and 14.

The container body 220 is manufactured with an integral closure cap 201 of a suitable plastic material, e.g. polyethylene or polypropylene, by injection moulding. The closure cap 201 has a body 202 with a peripheral wall 203 and a top wall 204. The top wall 204 is provided with a dispensing passage 205, which is defined by a tubular collar 206 arranged to the top wall 204. The closure cap 201 has lips 208 arranged in a round configuration integrally formed on the lower surface of the top wall 204 and extending therefrom coaxially with the dispensing passage 205. In FIGS. 13 and 14 these lips are shown in an unfolded state. The top wall 204 is, in the example shown, generally flat and with respect thereto has an inwardly extending central portion 204a, which is preferably conical, in the centre of which the collar 206 is located.

A resilient self closing valve 20 is positioned in the closure cap 201 by inserting the central portion 21 and the skirt 23 from the open ended side of the body concentrically within the collar 206 in the dispensing passage 205. The flange 24 of the valve 20 is positioned against the lower end 207 of the collar 206 and the outer portion 25 is placed in the seat 210.

Next, the lips 208 are folded over the thickened portion 25 of the flange 24, preferably under application of ultrasonic vibrations as described in the above. Thereby, at least a part of the flange is enveloped between said wall or said lips 208 and the top wall 204 so as to secure the valve 20 in the closure cap 201.

The container body 220 can be filled with a substance, e.g., a cosmetic product, after which the open rear end 221 is closed by e.g. pressing it flat and sealing it by adding heat. Alternatively a bottom part (not shown) can be attached to the rear end to close it.

The invention claimed is:

1. A self-closing valve adapted to be arranged in a closure of a container, said self-closing valve being made of a resilient material and comprising a dome shaped central portion having a peripheral surface and having in an unloaded state a concave outer side and a convex inner side, wherein the surface at the concave outer side of the dome shaped central portion has in the unloaded state a constant radius of curvature seen in cross section, and wherein the inner side of the central portion, has a flat central surface portion and a conical outer surface portion which surrounds the flat surface portion, said dome shaped central portion being provided with at least one through slit, said slit being closed in said unloaded state, and said dome shaped central portion being deformable by pressure to a shape in which the slit is open, said self-closing valve further comprising a skirt which extends from the peripheral surface of the central portion in line with said peripheral surface such that an outer surface of the skirt and said peripheral surface are flush, said skin having an outwardly extending flange at an end remote from said peripheral surface of the central portion, wherein an annular groove is present at a transition between said skirt and said conical surface portion, said groove extending from an outer edge of the conical surface portion of the dome shaped central portion to the skirt.

2. The self-closing valve according to claim 1, wherein the conical surface portion is curved seen in cross section.

3. The self-closing valve according to claim 1, wherein the skirt of the valve has a thickness of about 0.3 mm.

4. The self-closing valve according to claim 1, wherein the skirt has a length in the range 3.5-5.5 mm.

5. The self-closing valve according to claim 1, wherein the groove between the skirt and the central portion of the valve has a depth of 0.4-1.2 mm measured from an outer edge of the conical surface portion.

6. The self-closing valve according to claim 5, wherein the groove between the skirt and the central portion of the valve has a depth of approximately 0.5 mm measured from the outer edge of the conical surface portion.

7. The self-closing valve according to claim 6, wherein the groove between the skirt and the central portion of the valve has a depth of approximately 1 mm measured from the outer edge of the conical surface portion.

8. The self-closing valve according to claim 1, wherein the skirt has a thickness of 0.3 mm, a length of 5 mm and the groove has a depth of 0.5 mm measured from an outer edge of the conical surface portion.

9. The self-closing valve according to claim 1, wherein the skirt has a thickness of 0.3 mm, a length of 4 mm, and the groove has a depth of 1 mm measured from an outer edge of the conical surface portion.

10. The self-closing valve according to claim 1, wherein the skirt of the valve is conical with an angle between a central axis of the valve and the skirt of about 1°.

11. The self-closing valve according to claim 1, wherein the outwardly extending flange, has a thickened portion.

\* \* \* \* \*